UNITED STATES PATENT OFFICE.

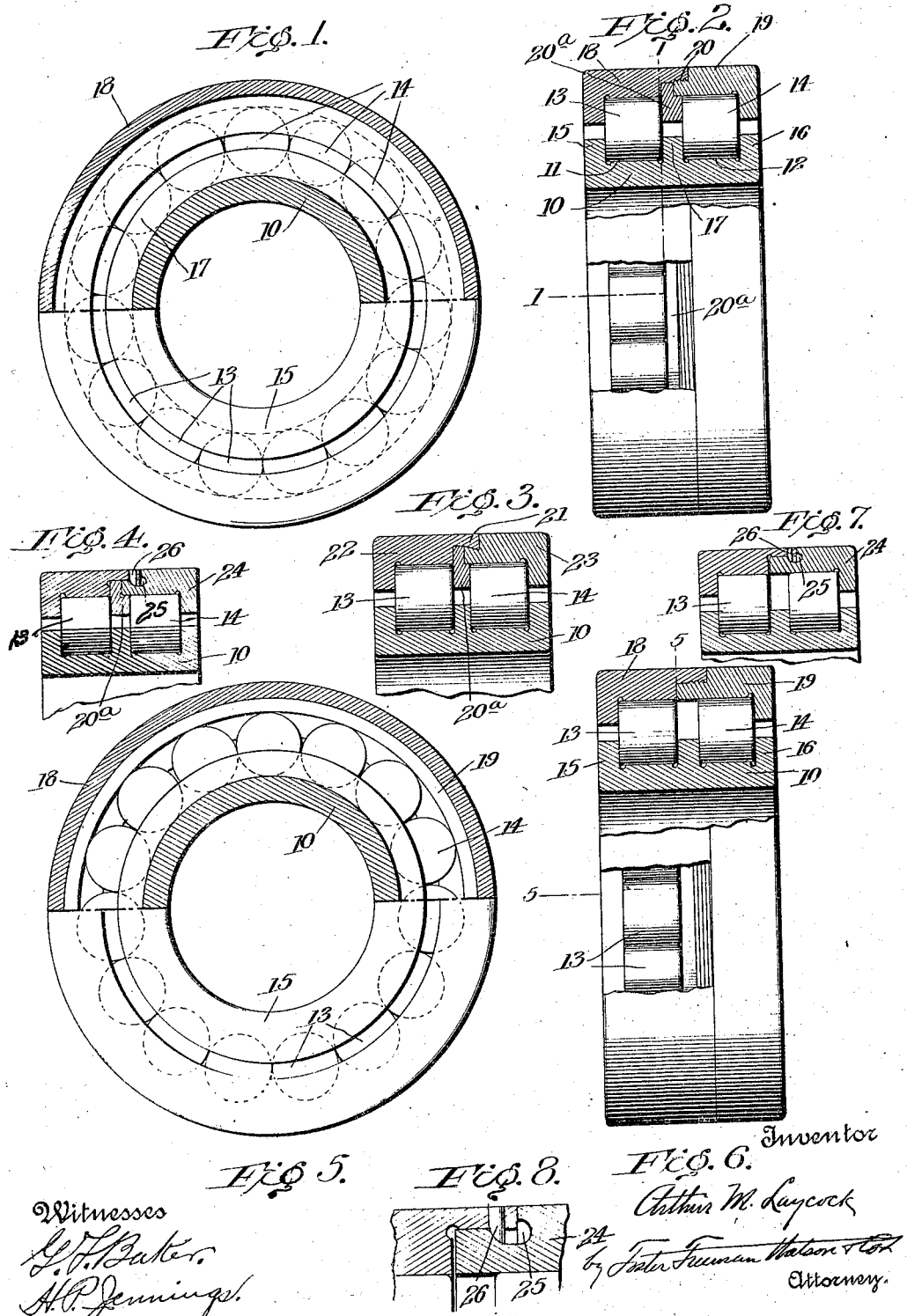

ARTHUR M. LAYCOCK, OF KINGSTON, PENNSYLVANIA.

ROLLER-BEARING.

1,178,526.  Specification of Letters Patent.  Patented Apr. 11, 1916.

Application filed December 1, 1915. Serial No. 64,471.

*To all whom it may concern:*

Be it known that I, ARTHUR M. LAYCOCK, subject of the King of Great Britain, residing at Kingston, Luzerne county, State of Pennsylvania, have invented certain new and useful Improvements in Roller-Bearings, of which the following is a specification.

This invention relates to roller bearings and more particularly to roller bearings for motor vehicle axles or other heavy service.

It is one of the objects of the invention to provide a bearing of comparatively simple construction which may be efficiently manufactured at low cost and which is thoroughly reliable and durable in service.

Other objects and the features of novelty will be apparent from the following description taken in connection with the accompanying drawings, in which:

Figure 1 is a partial side elevation and partial section on the line 1—1 of Fig. 2. Fig. 2 is an edge view of the bearing shown in Fig. 1 and with certain parts broken away and shown in section. Fig. 3 is a section similar to the upper part of Fig. 2 and showing a slight modification of the construction shown in Figs. 1 and 2. Fig. 4 is a fragmentary section similar to Fig. 3 and showing another modification. Fig. 5 is a view similar to Fig. 1 and showing still another modification. Fig. 6 is a view similar to Figure 2 and illustrating the form also shown in Fig. 5. Fig. 7 is a view similar to Fig. 4 but showing a modification of a part of Fig. 6. Fig. 8 is a view on an enlarged scale of a portion of the construction shown in Fig. 7.

Referring to the drawings, 10 indicates the inner race of the bearing having formed in its outer surface grooves 11 and 12 for the two series of square-ended cylindrical rollers 13 and 14 respectively. The race 10 is provided with the outer radially extending flanges 15 and 16 and a central flange 17 between which the rollers 13 and 14 are arranged and which flanges are adapted to take end thrust in the rollers.

The outer race is composed of two parts 18 and 19 preferably telescoped together as indicated at 20 and in Fig. 2 the telescoped ends are threaded together. Between the parts 18 and 19 there is secured a central ring 20ª in line with the flange 17 and adapted to coöperate with the latter to take up the thrust in the rollers.

The form shown in Fig. 3 is similar to that shown in Fig. 2 except that the threaded connection at 20 is replaced by turning a flange 21 on the part 22 into a suitable groove in the adjoining end of the part 23. In the form shown in Fig. 4 the arrangement is similar to that shown in Fig. 2 with the exception that the part 24 is provided with an external groove 25 into which one or more small pins 26 project. The groove 25 may also be used for grinding the part 24 during the machining thereof.

It will be understood that as ordinarily used the inner end and outer races of the bearing are so confined as to have practically no endwise movement relatively to the part on which they are mounted. It will therefore be seen that the pins 25 and the other forms of connection which I have illustrated will be ample for the purpose of securing the parts of the outer end together.

In the form of the invention illustrated in Figs. 5 and 6 the construction is similar to that shown in Figs. 1 and 2 with the exception that the ring 20ª is omitted and all of the thrust is taken up through the other part of the races. In the form shown in Fig. 7 the construction is similar to that shown in Fig. 4 with the exception of the omission of the central ring 20ª between the rolls.

In Figs. 1, 2, 3 and 4 the unit pressure on the end of the rollers, due to axial loading, is just one-half as great, as in the construction shown in Figs. 5, 6, 7 and 8, in other words the former bearing will take twice the end pressures subjected to the latter.

Having thus described my invention, what I claim is:

1. In a roller bearing, the combination of two sets of square-ended cylindrical rollers, an inner race provided with two roller grooves having a flat-sided radial flange between them adapted to take the end thrust from either set of rollers, a two part outer race having flanges adapted to engage the outer sides of the rollers, the parts of the outer race having ends in telescoped relation, and a thrust ring secured between the parts of the outer race.

2. In a roller bearing, the combination of two sets of square-ended cylindrical rollers, an inner race provided with two roller grooves having a flat-sided radial flange between them adapted to take the end thrust from either set of rollers, a two part outer race having flanges adapted to engage the outer sides of the rollers, and the parts of the outer race having ends in telescoped relation, the inner of said telescoped parts having an external circumferential groove, and one or more pins secured to the outer of said telescoped parts and projecting into said external groove and securing the parts together.

3. In a roller bearing, the combination of two sets of rollers, an inner race provided with two roller grooves having a radial flange between them adapted to take the end thrust from either set of rollers, a two part outer race having flanges adapted to engage the outer sides of the square ended rollers, and the parts of the outer race having ends in telescoped relation, the inner ends of said telescoped parts having an external groove, one or more pins projecting into said external groove and securing the parts together, and a thrust ring separating the two sets of rollers and secured between the parts of the outer race.

In testimony whereof I affix my signature.

ARTHUR M. LAYCOCK.

Copies of this patent may be obtained for five cents each, by addressing the "Commissioner of Patents, Washington, D. C."